(12) United States Patent
Kawasoe et al.

(10) Patent No.: US 7,191,043 B2
(45) Date of Patent: Mar. 13, 2007

(54) VEHICULAR PASSENGER PROTECTION SYSTEM AGAINST LATERAL COLLISION

(75) Inventors: Kiminari Kawasoe, Anjo (JP); Seiya Ide, Okazaki (JP)

(73) Assignee: Denso Corporation, Kariya (JP)

( * ) Notice: Subject to any disclaimer, the term of this patent is extended or adjusted under 35 U.S.C. 154(b) by 321 days.

(21) Appl. No.: 10/653,066

(22) Filed: Sep. 3, 2003

(65) Prior Publication Data

US 2004/0050610 A1 Mar. 18, 2004

(30) Foreign Application Priority Data

Sep. 18, 2002 (JP) ............................. 2002-272118
Jun. 12, 2003 (JP) ............................. 2003-168043

(51) Int. Cl.
*B60R 21/02* (2006.01)
*B60R 21/13* (2006.01)
*B60R 21/16* (2006.01)
*G06F 7/00* (2006.01)

(52) U.S. Cl. .................... 701/45; 701/82; 280/734; 280/735; 340/440

(58) Field of Classification Search ................ 701/82; 340/426.25; 280/757, 758; 73/512, 514.02; 180/232, 271, 274
See application file for complete search history.

(56) References Cited

U.S. PATENT DOCUMENTS

| | | | | |
|---|---|---|---|---|
| 5,338,062 A | * | 8/1994 | Kiuchi et al. ............... | 280/735 |
| 6,113,138 A | * | 9/2000 | Hermann et al. ........... | 280/735 |
| 6,374,172 B1 | * | 4/2002 | Yamaguchi et al. .......... | 701/90 |
| 6,529,810 B2 | * | 3/2003 | Foo et al. ..................... | 701/45 |
| 6,549,836 B1 | * | 4/2003 | Yeh et al. ..................... | 701/45 |
| 6,553,295 B1 | * | 4/2003 | Bauch et al. ................. | 701/45 |
| 6,591,932 B1 | * | 7/2003 | Drummond et al. ........ | 180/282 |
| 6,898,498 B1 | * | 5/2005 | Wessels et al. .............. | 701/45 |
| 2001/0043011 A1 | * | 11/2001 | Ugusa et al. .............. | 307/10.1 |
| 2002/0099486 A1 | * | 7/2002 | Nagao et al. ................. | 701/45 |
| 2003/0100983 A1 | * | 5/2003 | Bullinger et al. ............. | 701/45 |
| 2004/0117089 A1 | * | 6/2004 | Grotendiek et al. .......... | 701/45 |

FOREIGN PATENT DOCUMENTS

JP A-11-180249 7/1999

* cited by examiner

*Primary Examiner*—Thomas Black
*Assistant Examiner*—Christine M. Behncke
(74) *Attorney, Agent, or Firm*—Posz Law Group, PLC

(57) ABSTRACT

A vehicle has two acceleration sensors, which are provided forward and rearward respectively from the rear end of a driver seat in the vehicle. The acceleration sensors output signals, which are the basis for sensing a signal related to rotation of the vehicle. The sensed signal is the basis for determining whether the vehicle has a lateral collision.

16 Claims, 9 Drawing Sheets

VEHICULAR PASSENGER PROTECTION SYSTEM AGAINST LATERAL COLLISION

CROSS REFERENCE TO RELATED APPLICATION

This application is based on and incorporates herein by reference Japanese Patent Applications No. 2002-272118 filed on Sep. 18, 2002 and No. 2003-168043 filed on Jun. 12, 2003.

FIELD OF THE INVENTION

The present invention relates to a vehicular passenger protection system against lateral collision that actuates a seat belt, an airbag or another passenger protecting device of a vehicle in response to a lateral collision of a vehicle.

BACKGROUND OF THE INVENTION

JP-A-11-180249 discloses a conventional protection system against lateral collision that is fit on a vehicle chassis. This protection system has acceleration sensors for sensing the lateral force acting on the vehicle chassis. If the output from each of the acceleration sensors exceeds a threshold, the protection system determines that the vehicle had a lateral collision. This protection system then actuates protecting devices of the vehicle to protect the passengers in the vehicle. As a general rule, a low-frequency component of the output from each of the acceleration sensors is extracted through a low-pass filter or an integration circuit. The amplitude of the low-frequency component is compared by a comparison circuit so that malfunctions due to high-frequency noises can be suppressed.

In this system, the acceleration sensors are fit to the right and left side walls of the vehicle chassis as side wall sensors. If another vehicle collides with one of the side walls, a great impact force acts on the associated sensor mounted near the side wall. This sensor then outputs a voltage proportional to the impact force. This output voltage triggers to actuate the airbag or the like installed in the vehicle chassis. Each of the acceleration sensors (side wall sensors) mainly senses the plastic or elastic deformation of the adjacent side wall due to a lateral collision of the vehicle chassis. Each sidewall sensor also senses the movement of the whole vehicle chassis due to the lateral collision.

The side wall sensors become less sensitive to the impact force as located away from the point on the side wall where the impact force acts. Accordingly, two such sensors should be fit to a front portion and a rear portion of each of the right and left sidewalls (4 sensors in total). More preferably, three such sensors should be fit to a front portion, a middle portion and a rear portion of each side wall (6 sensors in total). However, if the driver strongly closes a door of the vehicle, impact force that is not so weak acts on the side wall sensors, which may then cause the airbag or the like to malfunction.

In order to solve this problem, it is proposed that an additional acceleration sensor be fit in the vehicle dashboard and near the center of the vehicle, which is less influenced by impact force than the side walls when the doors are opened and closed. The impact force developed by a lateral collision of the vehicle is damped and delayed by the deformation and/or displacement of the vehicle chassis before transmitted to this central sensor. Accordingly, by using the output from the central sensor, it is possible to exclude relatively small impulses, such as the impulses developed when the doors are closed strongly, and to sense only the great impulses developed by the lateral collision. It is also proposed that the central sensor and the side wall sensors be fit in the vehicle chassis to improve the sensing accuracy.

However, the outputs from the acceleration sensors for sensing lateral collisions are influenced by not only the collision impact but also the lateral movement of the vehicle chassis due to the lateral collision etc. Depending on which longitudinal position on the vehicle the lateral collision occurs, this influence may reduce the impact forces sensed by the acceleration sensors. Consequently, the passenger protection system may not be able to be properly actuated.

For example, if a lateral collision occurs at a rear portion of the vehicle on a road surface having a low coefficient of friction, the vehicle is rotated angularly laterally in the lateral collision direction and may be rotated angularly to a considerable degree. If the center of rotation (spinning) is rear from the acceleration sensors, forces (acceleration) act on the sensors in the direction reverse to the collision direction. After all, the rotation makes the outputs from the acceleration sensors lower than if the center of rotation is not rear from the sensors.

When a lateral collision occurs with the vehicle, the center of rotation of the vehicle is determined by the center of inertia mass (the longitudinal center of gravity) of the vehicle and the positions of the four tires, which resist the rotation of the vehicle. In general, when a lateral collision occurs with the rear portion of the vehicle, the center of rotation is positioned longitudinally midway between the front and rear tires.

SUMMARY OF THE INVENTION

In view of the foregoing problem, the object of the present invention is to provide a vehicular passenger protection system against lateral collision that can accurately detect a lateral collision of the vehicle and protect passengers.

According to a first aspect of the present invention, a protection system against lateral collision is provided for a vehicle. The protection system includes a first sensing section and a second sensing section, which may be acceleration sensors, provided forward and rearward respectively of the rear end of a driver seat of the vehicle. The result of a calculation of outputs from the two sensors is the basis for determining whether the vehicle has a lateral collision. The calculation is an operation of the value of a function. The parameters of the function may be analog or digital signals output from the sensors and correlated to lateral force.

Alternatively, outputs from the sensors may be multilevel signals, combinations of which may be stored in advance in a map of the combinations and function values. The combinations can be substituted into the map in order to find a function value. However, the logical operations of the binary signals of the outputs from the sensors are excluded. Consequently, it is possible to selectively extract, from the forces developed by a lateral collision of the vehicle, the forces correlated to the value of the function of outputs from the two sensors, and to selectively attenuate the correlated forces. This makes it possible to inhibit the vehicular lateral collision sensing accuracy from being lowered by the correlated forces.

In FIG. 1, a vehicle 1 is fit with a central acceleration sensor at a point P and has a center of rotation M. The acceleration sensor senses lateral force (acceleration) acting on the vehicle. In general, the center of rotation of a vehicle is adjacent to the center of gravity of the vehicle. If a lateral collision occurs at point PO in a rightward direction on the vehicle 1, a component of force F0 acts on the point P0 and rotates the vehicle angularly in the counterclockwise direction on the center of rotation M. The lateral collision with the point P0 gexerts a force F1 in this direction on the point P. The rotation exerts a force F2 on the acceleration sensor at the point P in such a direction as to reduce the force F1. The resultant lateral force F acting on the point P decreases to F=F1−F2.

In FIG. 2, a vehicle 1 has a front acceleration sensor (first sensing section) at a point P1 and a rear acceleration sensor (second sensing section) at a point P2. If a lateral collision occurs at a rear portion of the vehicle, a force F4 is exerted in the collision direction on the point P2, and the vehicle is rotated counterclockwise around its center of rotation M. The rotation exerts a force F3 on the point P2. The lateral force acting on the front acceleration sensor at the point P1 decreases to F=F1−F2, as described above. However, the lateral force acting on the rear acceleration sensor at the point P2 increases to the sum of F3 and F4, that is, F=F3+F4.

Accordingly, by performing a calculation of outputs from the two sensing sections, it is possible to accurately sense the lateral collision regardless of the rotation. In FIG. 2, if a lateral collision occurs at the front portion of the vehicle, the clockwise rotation reduces the output from the rear acceleration sensor at the point P2, but increases the output from the front acceleration sensor at the point P1. Accordingly, it is possible to accurately sense the lateral collision regardless of the rotation.

It is preferable that the first sensing section be forward of the rear end of the driver seat and positioned centrally between both right and left sides of the vehicle. It is also preferable that the second sensing section be rearward of the rear end of the driver seat and positioned centrally between both right and left sides of the vehicle. Normally, this positions the center of rotation of the vehicle between the two sensing sections, so that the foregoing effect can be secured. Because the two sensing sections are positioned centrally between both lateral sides of the vehicle, it is possible to cope with lateral collisions occurring on either side. Because the two sensing sections are away from the doors of the vehicle, it is possible to sufficiently reduce the malfunction of the sensors that may be caused when the doors are opened and closed strongly.

It is furthermore preferable that the first sensing section includes a left front sensor and a right front sensor, which are forward of the rear end of the driver seat and adjacent to the left and right side walls respectively of the vehicle. It is also preferable that the second sensing section includes a left rear sensor and a right rear sensor, which are rearward of the rear end of the driver seat and adjacent to the left and right side walls respectively. This makes it possible to perform the calculation, with the sensors more sensitive to the lateral collision.

The protection system against lateral collision might also include a center front sensor and a center rear sensor that are positioned centrally between both lateral sides of the vehicle and spaced a predetermined interval from each other longitudinally of the vehicle. For example, the average of outputs from the left front and right front sensors approximates the output from the center front sensor. Likewise, the average of outputs from the left rear and right rear sensors approximates the output from the center rear sensor. Accordingly, by performing a calculation of the two averages, it is possible to find a calculation result similar to that for the center front and center rear sensors.

It is furthermore preferable that the first sensing section includes a left front sensor and a right front sensor, which are forward of the rear end of the driver seat and adjacent to the left and right side walls respectively of the vehicle. It is also preferable that the second sensing section includes a center rear sensor, which is rearward of the rear end of the driver seat and positioned centrally between both sides of the vehicle. For example, by using the average of outputs from the left front and right front sensors, which are a pair of side wall sensors, it is possible to achieve an effect similar to that of the center front sensor, with the first sensing section more sensitive to lateral collisions. Likewise, the calculation might be performed with outputs from a center front sensor, a left rear sensor and a right rear sensor.

It is furthermore preferable that the first sensing section includes a left front sensor and a right front sensor, which are forward of the rear end of the driver seat and adjacent to the left and right side walls respectively of the vehicle, and a center front sensor, which is forward of the rear end of the driver seat and positioned centrally between both sides of the vehicle. It is also preferable that the second sensing section includes a center rear sensor, which is rearward of the rear end of the driver seat and positioned centrally between both sides of the vehicle. The degree of rotation may be sensed by the center front and center rear sensors, which receive little door noise. The sensed degree can be the basis for correcting the outputs from the left front and right front sensors, which are side wall sensors and more sensitive to lateral collisions.

It is furthermore preferable that the first sensing section includes a left front sensor and a right front sensor, which are forward of the rear end of the driver seat and adjacent to the left and right side walls respectively of the vehicle, and a center front sensor, which is forward of the rear end of the driver seat and positioned centrally between both sides of the vehicle. It is also preferable that the second sensing section includes a left rear sensor and a right rear sensor, which are rearward of the rear end of the driver seat and adjacent to the left and right side walls respectively, and a center rear sensor, which is rearward of the rear end of the driver seat and positioned centrally between both sides of the vehicle. The degree of rotation may be sensed by the center front and center rear sensors, which receive little door noise. The sensed degree can be the basis for correcting the outputs from the left front, right front, left rear and right rear sensors, which are side wall sensors and more sensitive to lateral collisions.

Furthermore preferably, it should be determined that the vehicle has a lateral collision if the output from either of the two sensing sections exceeds a predetermined threshold. This enables the protection system to comprise a logical sum circuit for two comparison outputs, thus simplifying the circuit configuration. As described above, the determining section bases its determination on the result of a calculation of outputs from the two sensors forward and rearward of the driver seat. Accordingly, the present invention bases the collision determination on the logical sum of binary outputs from the first and second sensing sections, as well as the result of a calculation of outputs from the two sensors. The sensors for obtaining the results of a calculation and the logical sum of binary outputs may be or may not be the same. The result of the calculation may be the basis for detecting the degree of rotation, which may be the basis for changing the threshold levels for the outputs from the first and second sensing sections. This calculation result may also be the basis for reducing the influence of rotation on the outputs from these sensing sections and binarizing them.

Furthermore preferably, it should be determined whether the function value exceeds a predetermined threshold, and the result of the determination should be the basis for determining whether the vehicle has a lateral collision. This complicates the circuit configuration, but makes the collision determination accurate by, for example, excluding the influence of rotation more reliably, in comparison with the conventional system for sensing a lateral collision of a vehicle by simply determining whether the output from one of the sensors of the system exceeds a threshold.

Furthermore preferably, it should be determined whether the difference between outputs from the first and second sensing sections exceeds a predetermined threshold, and the result of the determination should be the basis for determining whether the vehicle has a lateral collision. As shown in FIG. 2, the difference (F3−F2) between the outputs from the two sensing sections is nearly twice F3. The occurrence of such rotation means a lateral collision with the rear portion of the vehicle and can be the basis for determining that the vehicle has a lateral collision. Then, the passenger protection system of the vehicle may be actuated. By contrast, if the lateral collision does not angularly rotate the vehicle, the difference between the outputs from the two sensing sections is very small. This makes it evident that the difference between the outputs from the two sensors is the basis for fine detection of rotation.

The lateral collisions with the rear portion can be distinguished from the other lateral collisions. Otherwise, the rotation caused by a lateral collision can be distinguished from the vehicle displacement accompanied by no rotation caused by a lateral collision. Accordingly, the actuating modes for passenger protection can be changed between a case where a lateral collision causes a great rotation and a case where a lateral collision does not cause a great rotation. The actuating modes may be combinations of airbags installed in different positions in the vehicle. This makes it possible to change the combinations of airbags that should be actuated in a case where the vehicle is angularly rotated and a case where the vehicle is not angularly rotated.

Furthermore preferably, it should be determined whether the sum of outputs from the first and second sensing sections exceeds the threshold, and the result of the determination should be the basis for determining whether the vehicle has a lateral collision. In this case, if the rotation reduces the output from one of the sensing sections and increases the output from the other sensing section, it is possible to reduce the influence of the rotation on the output sum. This excludes the influence of the rotation from the collision determination. For example, as shown in FIG. 2, the sum of the outputs from the two sensing sections is F1+F2+F3+F4. The acceleration forces F2 and F3 that the rotation causes to act on the two acceleration sensors cancel each other. As a result, the output sum is nearly twice F1, so that the influence of the rotation can be excluded. Besides, the output nearly doubles, so that the SN ratio can be improved theoretically to a great degree in comparison with the conventional single-sensor type.

It is furthermore preferable that the function value be the basis for substantially changing the threshold. The result of the calculation of the outputs from the first and second sensing sections makes it possible to detect the degree of rotation and change the collision determination threshold levels for the outputs from the first and second sensing sections for sensing lateral force. It is accordingly possible to reduce the detrimental influence of the rotation on the determination of the magnitude of lateral force. For example, the degree of rotation may be determined with the pair of front and rear sensors positioned centrally between both sides of the vehicle. The result of the determination may be the basis for substantially changing the thresholds for the side wall sensors. The substantial change of each of these thresholds includes changing it and correcting an output from the associated side wall sensor. The change of each threshold is equivalent to changing an output from the associated sensing section, with the threshold kept constant. That is, the present invention involves changing the thresholds for the two sensing sections (acceleration sensors) by means of a function of outputs from the sensing sections. It is accordingly possible to reduce the influence of the rotation on the change of thresholds so that the thresholds can be properly changed.

In a preferred aspect of the present invention, the sensing sections for which the thresholds are changed are the acceleration sensors (side wall sensors) adjacent to both side walls of the vehicle. In this aspect, at least two sensing sections that generate outputs for changing the thresholds are the acceleration sensors (central sensors) positioned centrally between both sides of the vehicle. It is possible to inhibit the outputs from the central sensors, which are little influenced by the opening and closing of the vehicle doors, from being varied with the rotation.

In the meantime, the outputs from the central sensors are the basis for substantially changing the sensitivity of the side wall sensors. Accordingly, while the influence of the opening and closing of the vehicle doors can be excluded, the side wall sensors make it possible to reliably determine whether the vehicle has a lateral collision. For example, if the vehicle has no lateral collision, the outputs from the central sensors are the basis for increasing the thresholds for the side wall sensors to reduce the determination sensitivity for them. This prevents it from being falsely determined that outputs from the side wall sensors represent a lateral collision even when a door of the vehicle is closed.

By contrast, if the vehicle has a lateral collision, the outputs from the central sensors increase. The output increases are the basis for reducing the thresholds for the side wall sensors to increase the determination sensitivity for them. The increased sensitivity enables quick determination of the lateral collision on the basis of the outputs from the side wall sensors. The central sensors are at least two in number and spaced from each other longitudinally of the vehicle. The threshold control is based on the outputs from the central sensors. Accordingly, even if a lateral collision of the vehicle rotates it angularly, it is possible to reliably perform the threshold control based on the outputs from the central sensors that derive from the rotation.

It is furthermore preferable that the difference between the outputs from the two sensing sections be the basis for substantially changing the threshold. This makes it possible to well detect the degree of rotation of the vehicle. That is, the rotation can be well detected as shown in FIG. 2 and stated earlier. For example, when the vehicle is angularly rotated, the thresholds for the side wall sensors may be reduced so that the foregoing effect can be well achieved.

It is alternatively preferable that the sum of the outputs from the two sensing sections be the basis for substantially changing the threshold. As shown in FIG. 2 and stated earlier, this makes it possible to well detect the vehicle displacement independently of the rotation. When the vehicle is rotated angularly, this signal is the basis for reducing the thresholds for the side wall sensors to well achieve the foregoing effect.

It is furthermore preferable that the result of a calculation of outputs from the center front and center rear sensors be the basis for substantially correcting outputs from the left front and right front sensors. It should preferably be determined that the vehicle has a lateral collision if either of the substantially corrected outputs exceeds a predetermined threshold. This enables the rotation to be well sensed by the center front and center rear sensors, which receive little door noise. The signals from these two central sensors are the basis for excluding the influence of the rotation on the side wall sensor signals, which have high sensitivity to the lateral collision of the vehicle, so that the collision can be detected.

A protection system against lateral collision according to another aspect of the present invention includes a pair of sensors positioned centrally between both sides of the body of a vehicle and spaced from each other longitudinally of the body. The outputs from the sensors are the basis for detecting lateral collisions of the vehicle. The centrally positioned sensors for sensing lateral force receive little door noise. Because one of the sensors can sense lateral collisions occurring on both sides of the vehicle, the sensors can be fewer than the conventional side wall sensors.

It is preferable that the first and second sensing sections are located forward and rearward respectively of the longitudinal center of gravity of the vehicle. A lateral collision of the vehicle rotates it angularly on a center near this center of gravity. Accordingly, the rotation causes the two sensing sections to generate outputs in opposite directions lateral of the vehicle. These outputs improve the detection of rotation or better cancel each other.

It may be determined that the vehicle has a lateral collision if the output from either of the two sensing sections exceeds a predetermined threshold. This makes it possible to detect the lateral collision accurately without the influence of door noises.

The collision determination may be based on the result of a calculation of a predetermined function of outputs from the first and second sensing sections. As an example, if the collision determination is based on the comparison between the sum of the outputs from the two sensing sections and a threshold, it is possible to reduce the influence of the rotation of the vehicle. As another example, the difference between the outputs from these sensing sections may be the basis for detecting the degree of rotation, which may then be the basis for correcting the collision determination.

The collision determination may be based on the result of a combinational operation of multistage signals output from the first and second sensing sections. In this case, because no analog signal from the two sensors is used, the circuit configuration and the operation processing can be simple.

The sensing section may further include a third sensing section adjacent to a side wall of the vehicle. An output from the third sensing section may be substantially corrected with the result of the numeric or combinational operation. It may be determined that the vehicle has a lateral collision if the substantially corrected output exceeds a predetermined threshold. This makes it possible to finely determine the lateral collision without the influence of the rotation.

Outputs from the first and second sensing sections may be the basis for computing a signal positively correlated to the speed at which the vehicle is angularly rotated. The computed signal may be the basis for substantially correcting an output from the third sensing section. It may be determined that the vehicle has a lateral collision if the amplitude of the substantially corrected output exceeds a predetermined threshold. It is preferable that the third sensing section, which is adjacent to a side wall of the vehicle, be a side wall sensor for sensing lateral force. This makes it possible to accurately inhibit the rotation in sensitive detection of a lateral collision of the vehicle.

It may be determined that the vehicle has a lateral collision if an output from either of the first and second sensing sections and an output from the third sensing section exceed the respective thresholds. It may also be determined that the vehicle has a lateral collision if a predetermined threshold is exceeded by the value of a function of an output from each of the first, second and third sensing sections.

This makes it possible to use each of the three sensors independently for the detection of lateral collision, and to use the results of the calculations of the outputs from these sensors. The calculation results may be the basis for detecting a lateral collision of the vehicle when the vehicle is angularly rotated. If the output from each of the three sensing sections is very large, it is possible to determine a lateral collision quickly without waiting for the determination delay caused by the associated calculation.

A protection system against lateral collision according to a further aspect of the present invention includes a lateral force sensing section as included in the conventional protection system against lateral collision. The protection system according to this aspect also includes an rotation sensing section for sensing the degree of rotation of a vehicle, in addition to determining the output level of the lateral force sensing section. Both the sensed level of lateral force and the level of rotation of the vehicle are the basis for determining whether the vehicle has a lateral collision. Consequently, the collision determination is accurate regardless of the change of lateral force due to the rotation.

It is preferable that an output from the lateral force sensing section be the basis for substantially correcting an output from the rotation sensing section. It should preferably be determined that the vehicle has a lateral collision if the substantially corrected output exceeds a predetermined threshold. This makes it possible to reduce the influence of the rotation due to the lateral collision, by means of a simple structure.

The rotation sensing section may include a plurality of the lateral force sensing sections spaced from each other longitudinally of the vehicle. The determining section may detect the degree of rotation by means of a calculation of outputs from the lateral force sensing sections. Consequently, the rotation can be sensed by an acceleration sensor that can also function as the lateral force sensing section as stated already. This makes it possible to omit an exclusive sensor for sensing the rotation.

The rotation sensing section may include at least four sensing sections adjacent to both side walls of the vehicle and spaced predetermined intervals longitudinally of the vehicle. In this case, the rotation can be sensed by the side wall sensors that can sense the lateral collision sensitively with little delay. This makes it possible to simplify the circuit system.

The rotation sensing section may include a first sensing section and a second sensing section, which are positioned centrally between both sides of the vehicle and spaced a predetermined interval longitudinally of the vehicle. This makes it possible to reduce the influence of door noises and enables one sensor to sense the lateral collisions on both sides so that the circuit system can be simpler.

The lateral force sensing sections may be adjacent to at least one of both side walls of the vehicle and spaced at predetermined intervals longitudinally of the vehicle. This makes it possible to increase the sensitivity of the lateral force sensing sections for the determination of lateral collision, reduce the delay and reduce the influence of door noises when detecting the rotation.

The rotation sensing section may sense the rotation on the basis of the difference between outputs from the lateral force sensing sections spaced from each other longitudinally of the vehicle. This makes it possible to determine the level of rotation by means of a simple operation.

The longitudinal center of gravity of the vehicle may be positioned between the lateral force sensing sections spaced from each other longitudinally of the vehicle and forming the rotation sensing section. This makes it possible to improve the detectability of rotation.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS (First Embodiment)

Figure 3:
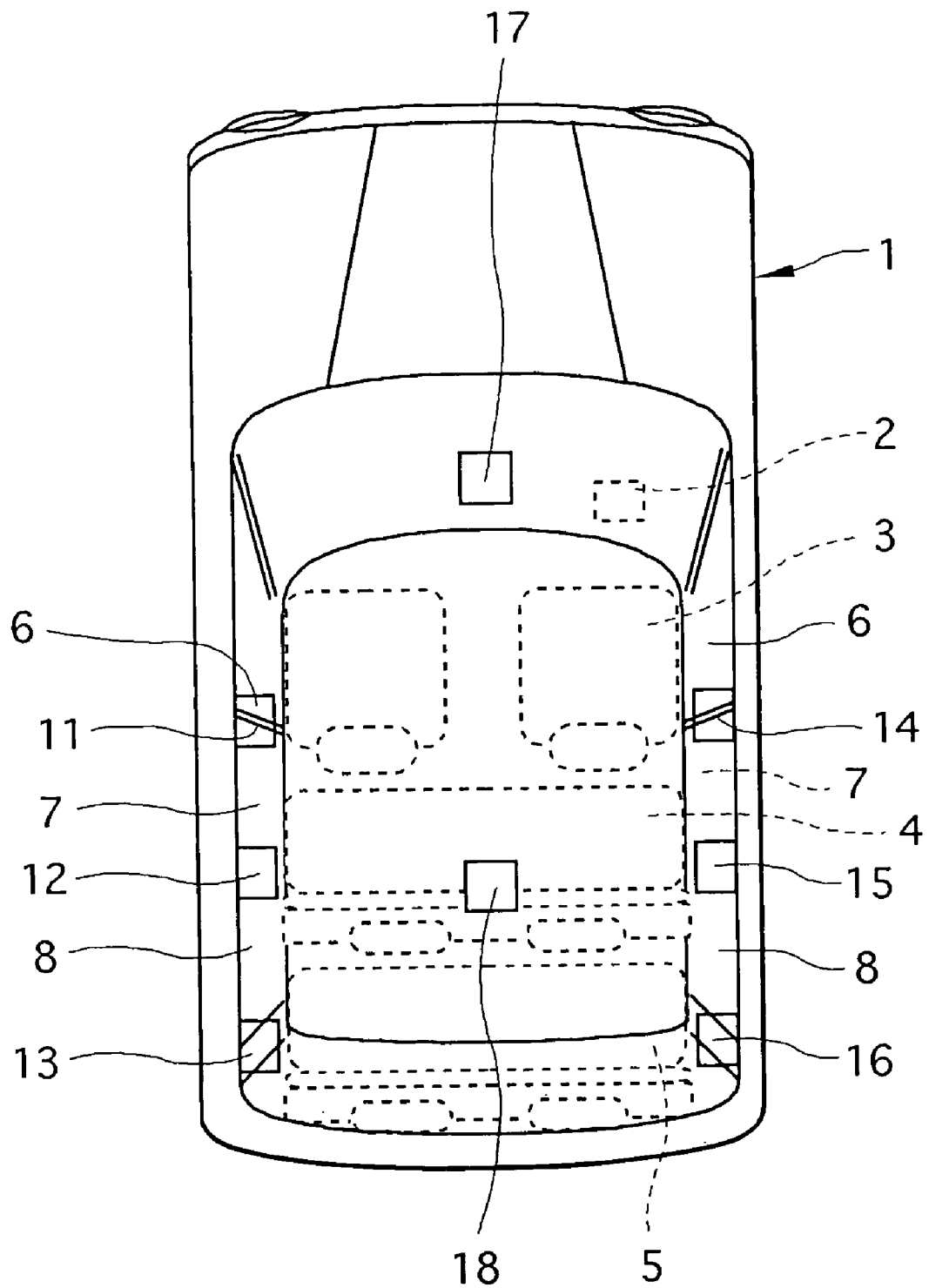
FIG. 3 is a plan view of a vehicle, showing the arrangement of acceleration sensors according to the first embodiment of the present invention.

Referring to FIG. 3, a vehicle 1 has a controller 2, a driver seat 3, a middle seat 4, a rear seat 5, front side windows 6, middle side windows 7 and rear side windows 8.

The vehicle 1 also has a left front acceleration sensor 11, a left middle acceleration sensor 12, a left rear acceleration sensor 13, a right front acceleration sensor 14, a right middle acceleration sensor 15, a right rear acceleration sensor 16, a center front acceleration sensor 17 and a center rear acceleration sensor 18, which overlaps vertically with the middle seat 4. Each of the left and right front acceleration sensors 11 and 14 is positioned between the adjacent front and middle side windows 6 and 7. The left middle acceleration sensor 12 is positioned roughly between the adjacent middle and rear side windows 7 and 8. The left rear acceleration sensor 13 is roughly rearward of the adjacent rear side window 8. The acceleration sensors 11–16 are side wall sensors. The acceleration sensors 17 and 18 are central sensors. The acceleration sensors 11–18 sense the lateral acceleration of the vehicle 1.

The controller 2 in this embodiment will be described below with reference to FIG. 4. For the sake of simplicity, the signal processing in the side wall sensors 14–16, which is identical with that in the side wall sensors 11–13, will not be described.

Figure 4:
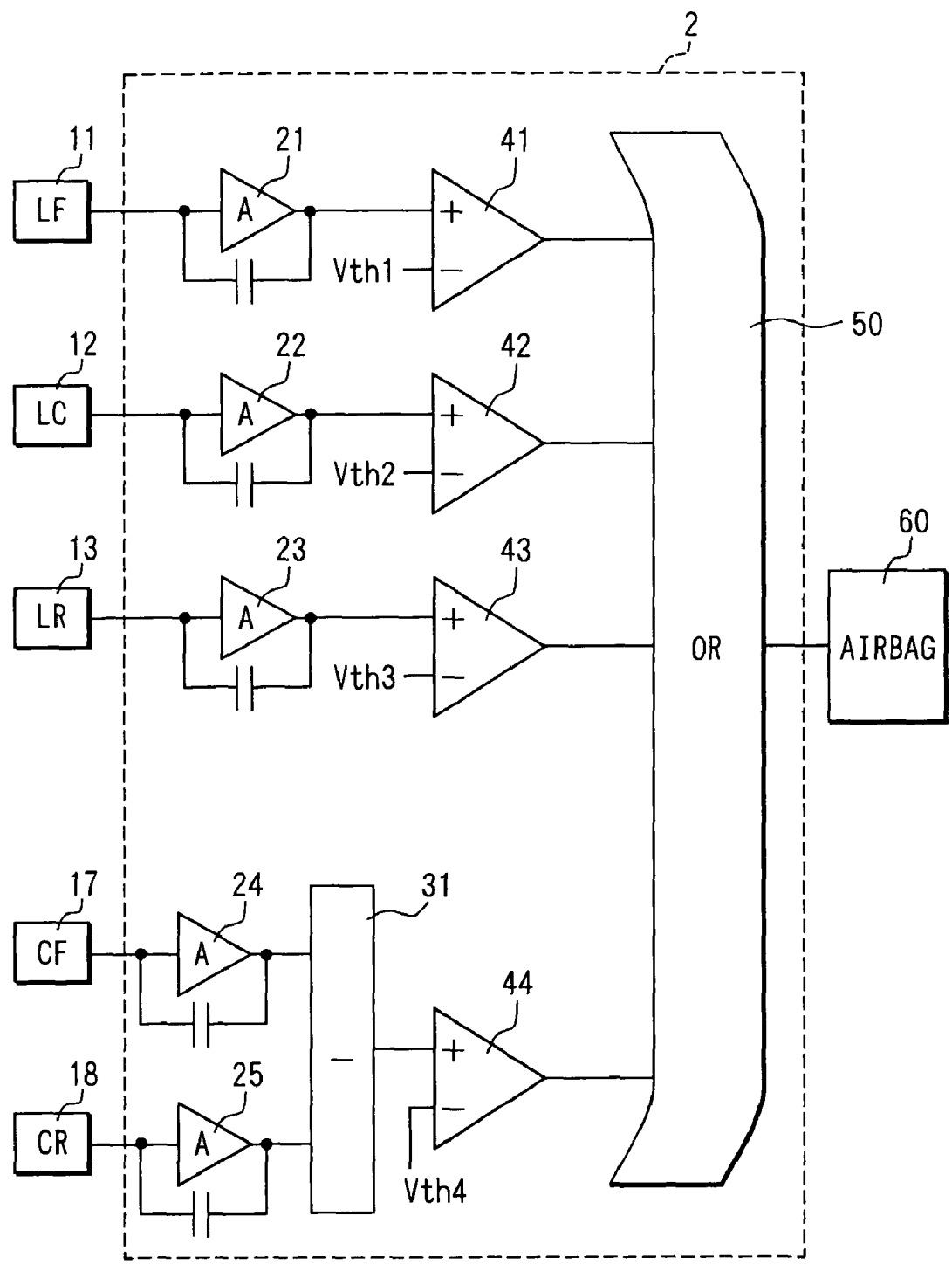
FIG. 4 is a circuit diagram of the circuitry of the first embodiment.

In FIG. 4, the acceleration sensors 11–18 output analog signal voltages nearly proportional to the lateral acceleration of the vehicle 1. The analog signal voltages output from the acceleration sensors 11–13, 17 and 18 are amplified and integrated by operational amplifiers 21–23, 24 and 25 for voltage amplification and integration, respectively. Instead of being integrated, the voltages might be processed by low-pass filters.

The analog signal voltages output from the operational amplifiers 21–23 are compared with threshold voltages Vth1, Vth2 and Vth3 by comparators 41–43, respectively, which output binary voltages through an OR circuit 50 and a power amplifier (not shown) to an airbag device 60 or another passenger protection device. If the analog signal voltage input into each of the comparators 41–43 is higher than the associated threshold voltage Vth, the level of the associated binary voltage is high.

The analog signal voltages output from the operational amplifiers 24 and 25 undergo subtraction through an operational amplifier 31 for analog subtraction. The voltage output from the operational amplifier 31 is compared with a threshold voltage Vth4 by a comparator 44, which outputs a binary voltage through the OR circuit 50 and the power amplifier (not shown) to the airbag device 60. The level of this binary voltage is high if the voltage output from the operational amplifier 31 is higher than the threshold voltage Vth4. It is obvious that the analog subtraction might be replaced by digital subtraction.

Thus, the output from each of the side wall sensors 11–16 is compared with the threshold Vth, and the difference between the outputs from the central sensors 17 and 18 is extracted and compared with the threshold Vth. The comparison of the output difference is the basis for determining whether the vehicle 1 is rotated angularly to a great degree. If the vehicle 1 is rotated angularly beyond a certain degree defined by the threshold Vth4, it is determined that the vehicle has a lateral collision. Consequently, even if a lateral collision rotates the vehicle 1 angularly to a great degree, the passengers in the vehicle can be protected.

(Second Embodiment)

The controller 2 in this embodiment will be described below with reference to FIG. 5. For the sake of simplicity, the signal processing in the side wall sensors 14–16 will not be described.

This embodiment differs from the first embodiment shown in FIG. 4 in having an operational amplifier 32 for analog addition in place of the operational amplifier 31 for analog subtraction.

Figure 5:
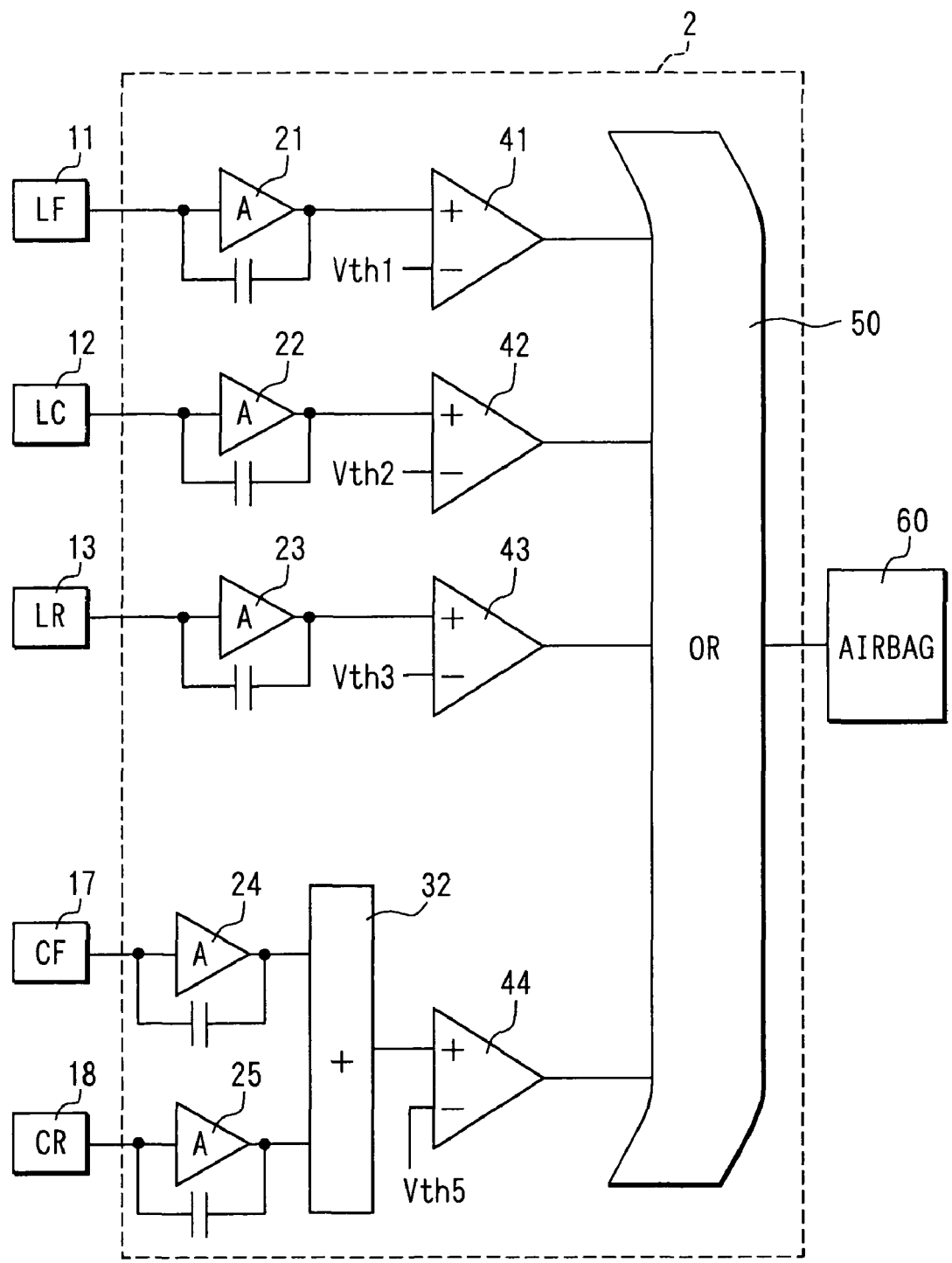
FIG. 5 is a circuit diagram of the circuitry of the second embodiment of the present invention.

In FIG. 5, the analog signal voltages output from the operational amplifiers 24 and 25 are added together by the operational amplifier 32. The voltage output from the operational amplifier 32 is compared with a threshold voltage Vth5 by the comparator 44, which outputs a binary voltage through the OR circuit 50 and the power amplifier (not shown) to the airbag device 60. The level of this binary voltage is high if the voltage output from the operational amplifier 32 is higher than the threshold voltage Vth5.

Thus, in this embodiment, the output from each of the side wall sensors 11–16 is compared with a threshold Vth5, and the sum of the outputs from the central sensors 17 and 18 is extracted and compared with the threshold Vth5. The comparison of the sum of the outputs is the basis for finding a lateral force less influenced by the rotation of the vehicle. It is then determined whether the lateral force is large or not. This makes it possible to determine whether the vehicle has a lateral collision, while suppressing the influence of the rotation.

Consequently, even if the rear portion of the vehicle has a lateral collision, which angularly rotates the vehicle, decreasing the analog signal voltage output from the central sensor 17, the rotation hardly influences the sum of the analog signal voltages from the central sensors 17 and 18. This makes it possible to determine whether the vehicle has a lateral collision, thereby protecting the vehicle passengers.

(Third Embodiment)

The controller 2 in this embodiment will be described below with reference to FIG. 6.

This embodiment differs from the first embodiment shown in FIG. 4 in having a threshold setting circuit 70 for variably setting the threshold voltages Vth1, Vth2 and Vth3 in amplitude depending on the level of the output from the comparator 44.

The threshold voltages Vth1, Vth2 and Vth3 are generated by a threshold voltage generator (not shown) and changed in amplitude into high or low levels by the threshold setting circuit 70. For example, a DC offset voltage may be added to each of the threshold voltages Vth1, Vth2 and Vth3 input from the threshold voltage generators. Alternatively, the threshold voltage generators might generate three pairs of high-level and low-level threshold voltages so that the threshold setting circuit 70 could select one of the high-level and low-level voltages of each pair as one of the threshold voltages Vth1, Vth2 and Vth3.

In this embodiment, if the central sensors 17 and 18 sense a lateral collision, the comparator 44 outputs a high-level voltage, which lowers the threshold voltages Vth1, Vth2 and Vth3 of the comparator 44. This enables the comparators 41–44 to sensitively detect the lateral collision on the basis of the outputs from the side wall sensors 11–13. When a door of the vehicle is closed, the outputs from the central sensors 17 and 18 are still low, and the output from the operational amplifier 31 for analog subtraction is low. Accordingly, the comparator 44 outputs a low-level voltage, which causes the threshold setting circuit 70 to set the threshold voltages Vth1, Vth2 and Vth3 high. This causes the comparators 41–44 to output low-level voltages, which prevent the actuation of the airbag device 60.

Thus, in this embodiment, the difference between the outputs from the central sensors 17 and 18 is the basis for changing the threshold voltages Vth1, Vth2 and Vth3 for the side wall sensors. Accordingly, the output difference is the basis for well sensing the rotation caused by a lateral collision at the rear portion of the vehicle, and the threshold voltages Vth1, Vth2 and Vth3 are changed to the low levels. Consequently, even if the lateral collision lowers the outputs from the side wall sensors, the rotation does not lower the lateral collision sensitivity of these sensors, because the thresholds as well can be lowered.

(Fourth Embodiment)

The controller 2 in this embodiment will be described below with reference to FIG. 7.

Figure 6:
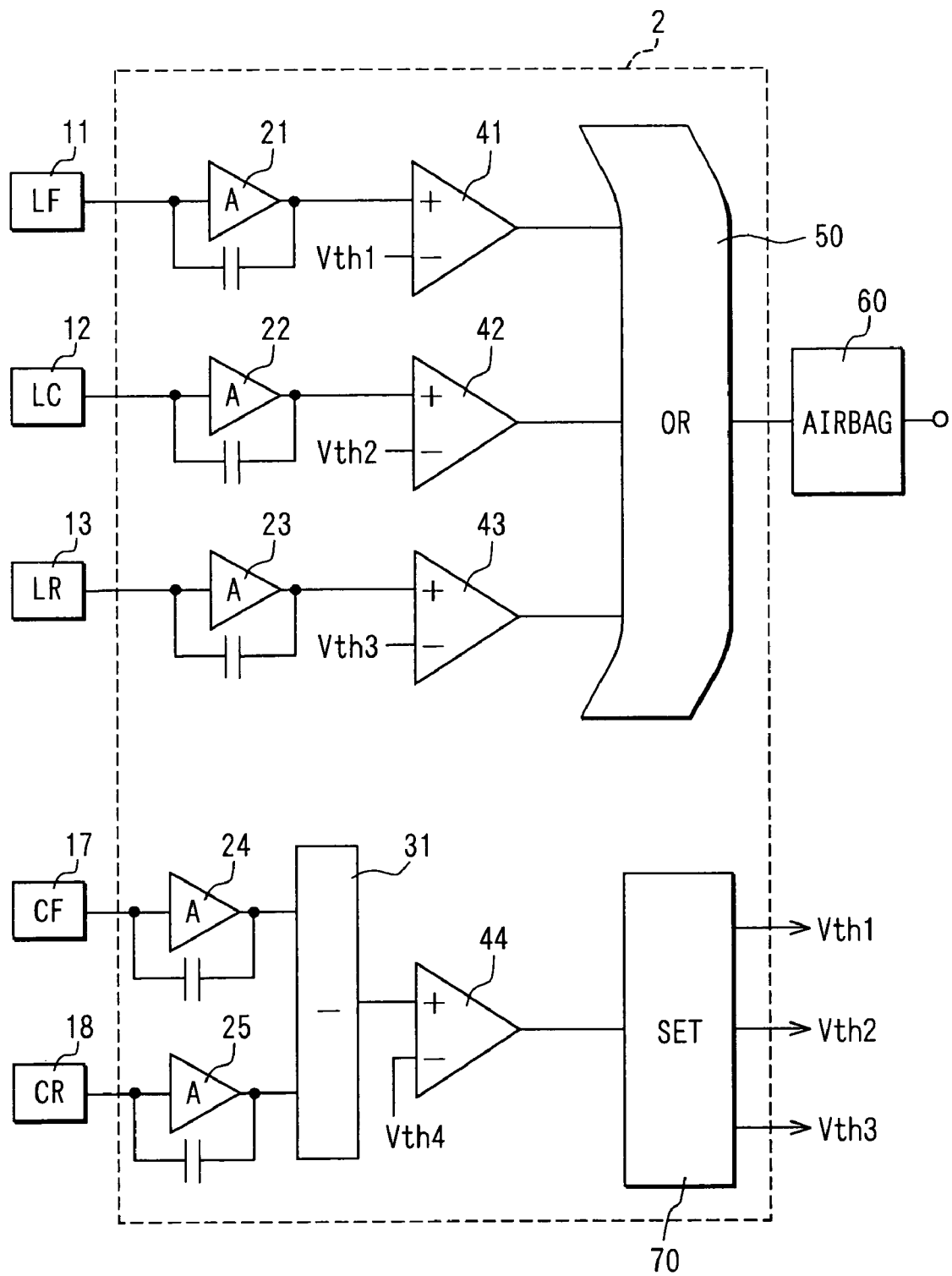
FIG. 6 is a circuit diagram of the circuitry of the third embodiment of the present invention.

This embodiment differs from the third embodiment shown in FIG. 6 in having the operational amplifier 32 for analog addition in place of the operational amplifier 31 for analog subtraction.

Figure 7:
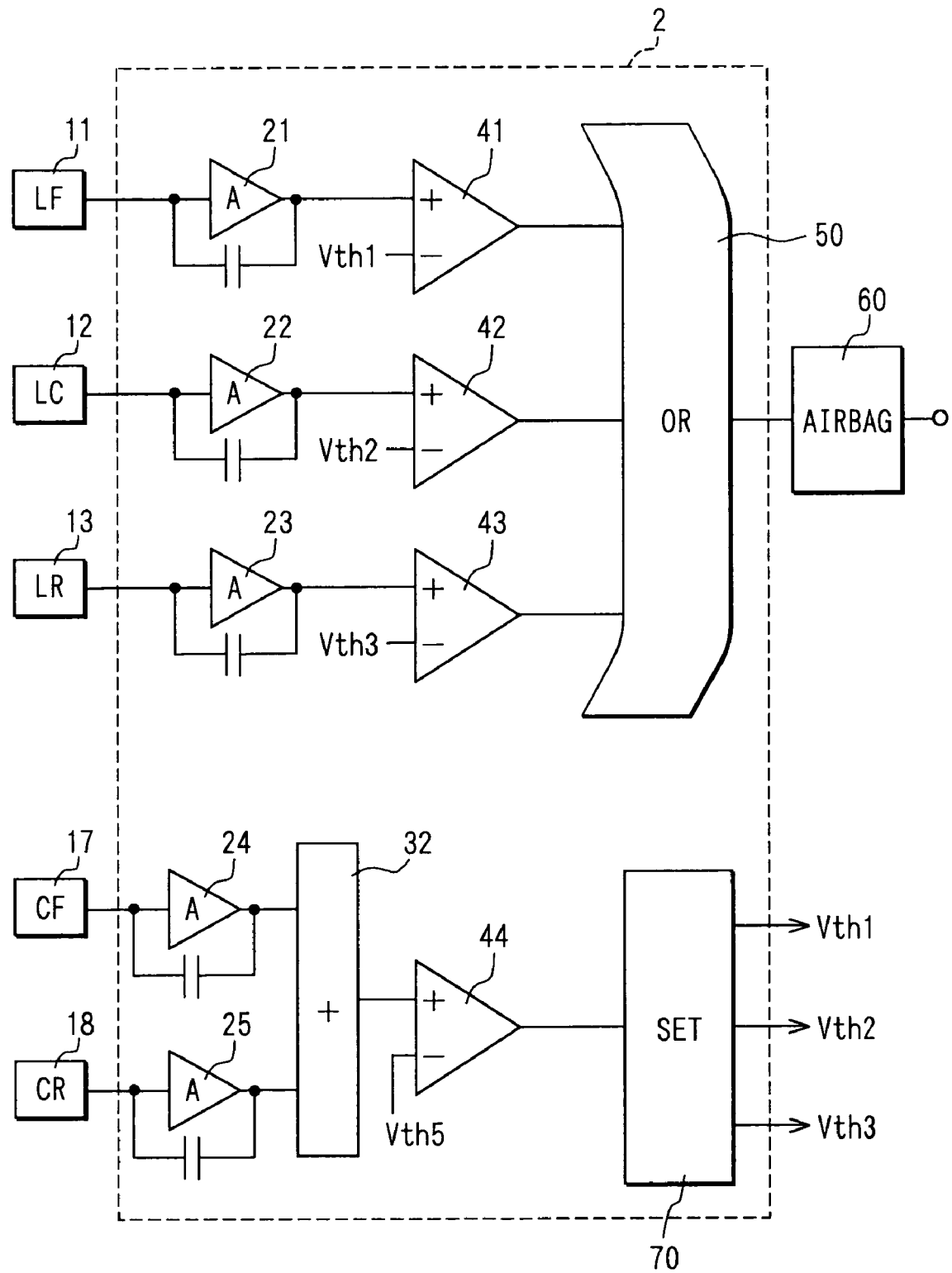
FIG. 7 is a circuit diagram of the circuitry of the fourth embodiment of the present invention.

In FIG. 7, the analog signal voltages output from the operational amplifiers 24 and 25 are added together by the operational amplifier 32. The voltage output from the operational amplifier 32 is compared with the threshold voltage Vth5 by the comparator 44, which outputs a binary voltage to the threshold setting circuit 70. The level of this binary voltage is high if the voltage output from the operational amplifier 32 is higher than the threshold voltage Vth5.

Thus, in this embodiment, the sum of the outputs from the central sensors 17 and 18 is the basis for changing the threshold voltages Vth1, Vth2 and Vth3 for the side wall sensors 11–16. The sum of the outputs is hardly affected by the rotation caused by a lateral collision of a rear portion of the vehicle. Only when this sum is large, the thresholds Vth1, Vth2, Vth3 for the side wall sensors can be lowered. When a door of the vehicle is closed, the central sensors 17 and 18 sense a lateral force that attenuates greatly relative to the lateral collision. Even in this case, because the sum of the outputs from the central sensors 17 and 18 is small, the thresholds for the side wall sensors 11–16 are still held high.

By contrast, when the vehicle has a lateral collision, the sum of the outputs from the central sensors 17 and 18 is large, and consequently the thresholds for the side wall sensors 11–16 are lowered. This enables the side wall sensors 11–16 to sensitively sense the lateral collision. Even if the vehicle is angularly rotated, the rotation exerts only a reduced influence on the sum of the outputs from the central sensors 17 and 18. Accordingly, it is also possible to reduce the influence of the rotation on the change of the thresholds for the side wall sensors 11–16. After all, while inhibiting the influence of rotation, it is possible to accurately determine whether the vehicle has a lateral collision.

(Fifth Embodiment)

Figure 8:
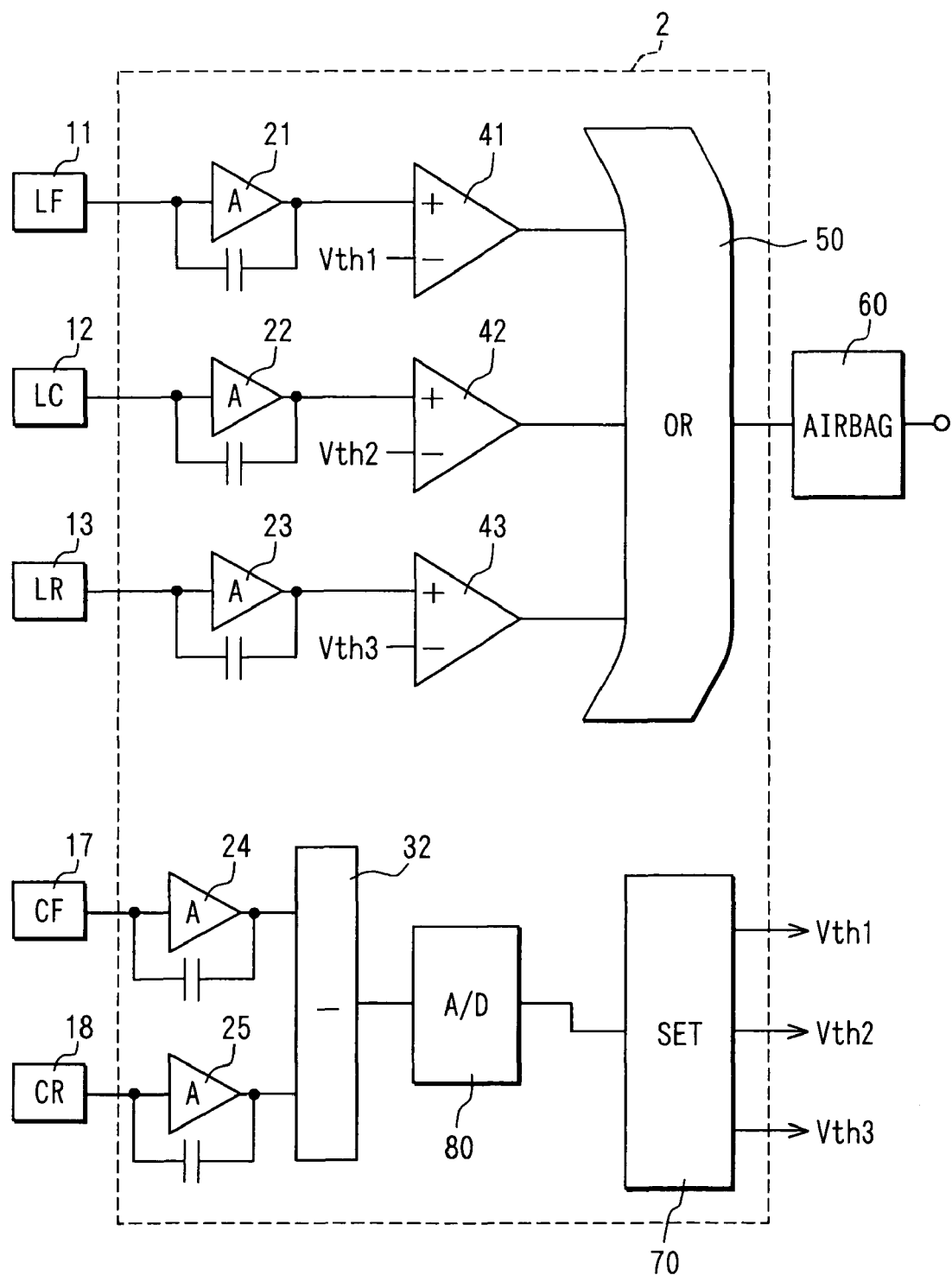
FIG. 8 is a circuit diagram of the circuitry of the fifth embodiment of the present invention.

The controller 2 in this embodiment will be described below with reference to FIG. 8.

This embodiment differs from the third embodiment shown in FIG. 6 in having an A-D converter 80 in place of the comparator 44 and a threshold setting circuit 70, which can perform calculations in it, in place of the threshold setting circuit 70 of FIG. 6.

The operational amplifiers 24 and 25 output analog signal voltages, which undergo subtraction through the operational amplifier 31. The output from this operational amplifier 31 is converted into a digital signal by the A-D converter 80. Accordingly, the digital signal represents the difference between the outputs from the center front sensor 17 and center rear sensor 18. As described above, this output difference includes many signal components that link with rotation. In this embodiment, the thresholds for the side wall sensors 11–13 are changed in series depending on the amplitude of the digital signal, which correlates greatly to rotation.

Figure 1:
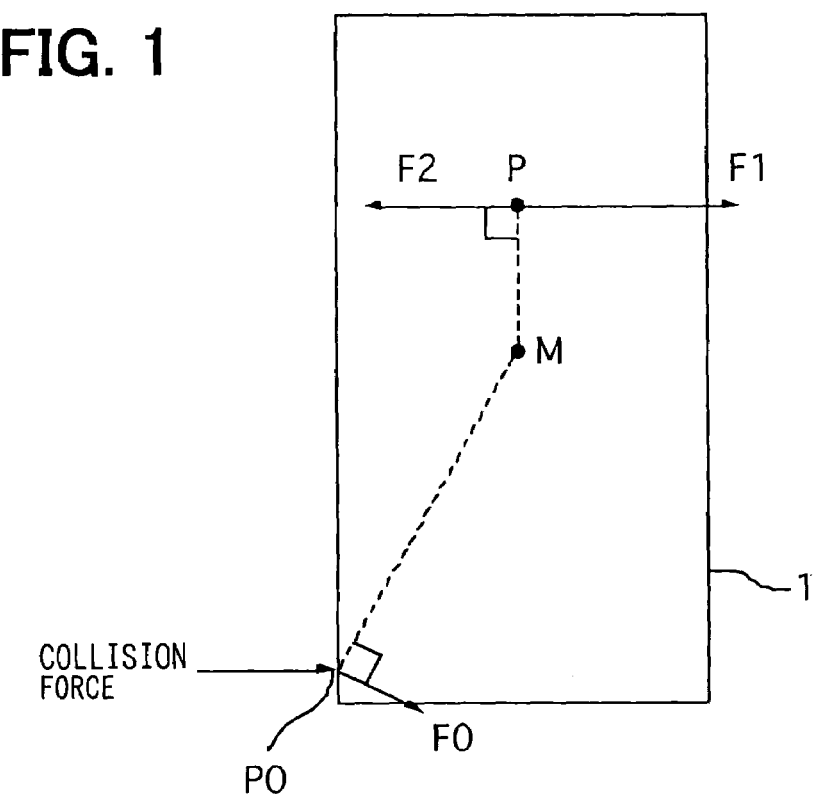
FIG. 1 is a schematic diagram of a sensing system, showing how a vehicle is rotated angularly by a lateral collision at a rear portion of the vehicle.

If a lateral collision occurs at the rear portion of the left side wall of the vehicle and angularly rotates the vehicle, as shown in FIG. 1, the rotation differently influences the outputs from the side wall sensors 11–13 in longitudinally different positions. Specifically, the rotation increases the output from the left rear sensor 13, exerts little influence on the left middle sensor 12 and reduces the output from the left front sensor 11.

Figure 2:
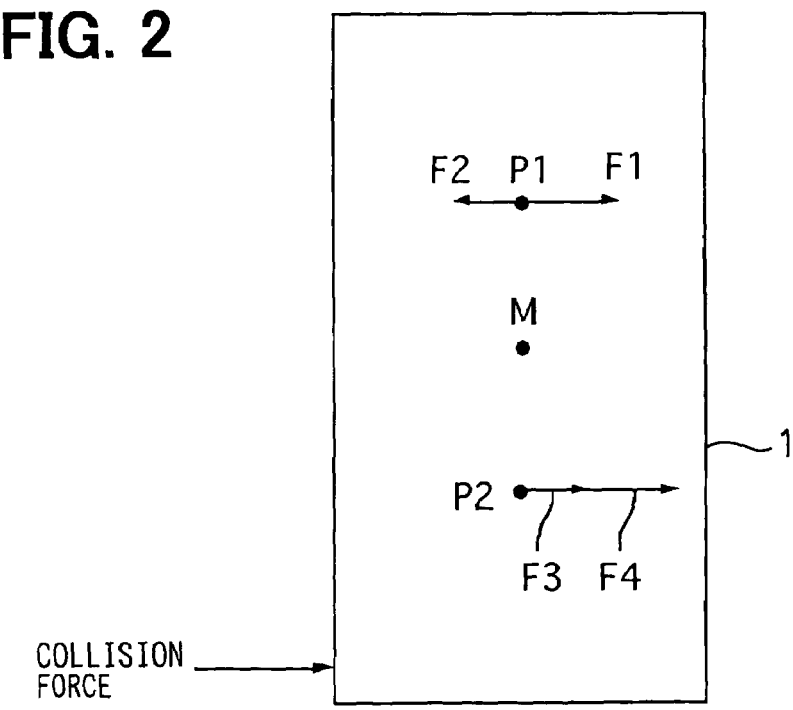
FIG. 2 is a schematic diagram of a sensing system according to the present invention, showing how a vehicle is rotated angularly by a lateral collision at a rear portion of the vehicle.

If a lateral collision occurs at the rear portion of the left side wall of the vehicle and angularly rotates the vehicle, forces act on the center front sensor 17 and the center rear sensor 18 as shown in FIG. 2. In this case, on the assumption that the voltage output from the center rear sensor 18 is positive (+), the difference between the outputs from the central sensors 17 and 18 is F3+F4−F1+F2, which is a positively high value. Accordingly, if the output difference is positively high, it is necessary to increase the threshold Vth3 for the left rear sensor 13 in proportion to the difference and reducing the threshold Vth1 for the left front sensor 11, without changing the threshold Vth2 for the left middle sensor 12. This makes it possible to cancel the increase in the output from the left rear sensor 13 and the decrease in the output from the left front sensor 11 due to the rotation.

This is similar to a case where a lateral collision occurs at the front portion of the left side wall, or at a rear or front portion of the right side wall of the vehicle, thereby angularly displacing the vehicle. Similarly, it is necessary to proportionally change the thresholds for the right front sensor 14 and the right rear sensor 16.

Thus, in this embodiment, different threshold changes are made because output variations due to the rotation differ between the front and rear side wall sensors. This makes it possible to determine more accurately, independently of the rotation, whether the vehicle has a lateral collision.

(Sixth Embodiment)

This embodiment excludes central sensors 17 and 18 and uses only side wall sensors 11, 13, 14 and 16. Of course, this embodiment might also use side wall sensors 12 and 15.

Figure 9:
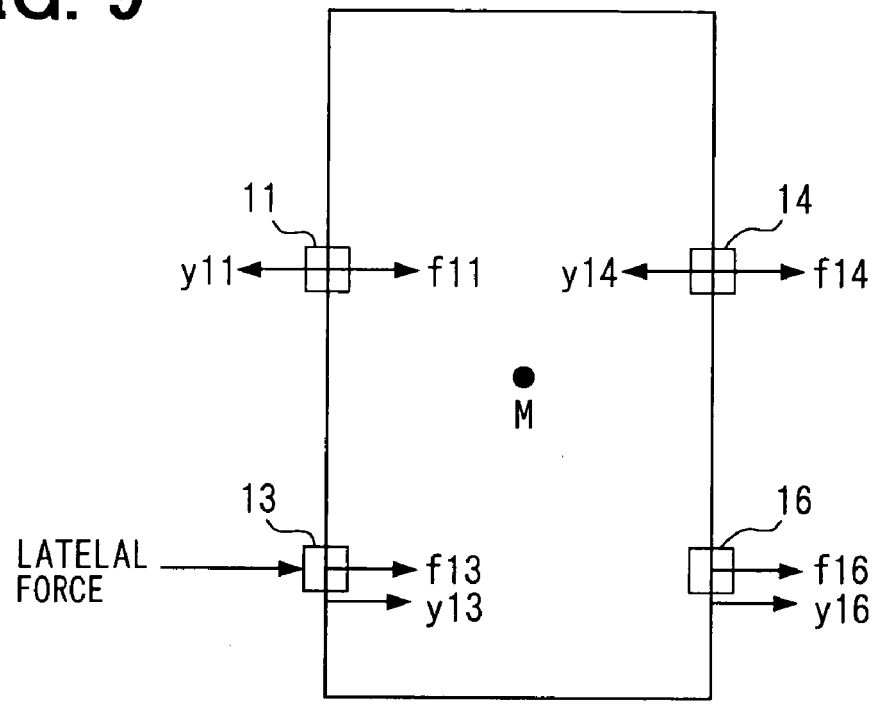
FIG. 9 is a schematic diagram of the sixth embodiment of the present invention.

This embodiment will be described with reference to FIG. 9 in a case where a lateral collision occurs at the rear portion of the left side wall of the vehicle. The outputs from the acceleration sensors 11, 13, 14 and 16 include lateral components f11, f13, f14 and f16, respectively, and components y11, y13, y14 and y16, respectively, resulting from the rotation.

The sum of the outputs from the left front sensor 11 and the right front sensor 14 would approximate the output from the center front sensor 17. The sum of the outputs from the left rear sensor 13 and the right rear sensor 16 would approximate the output from the center rear sensor 18. The sum of the outputs from the left rear sensor 13 and the right rear sensor 16 is subtracted from the sum of the outputs from the left front sensor 11 and the right front sensor 14, with a first remainder. The output from the center rear sensor 18 would be subtracted from the output from the center front sensor 17, with a second remainder, which is an output influenced greatly by the rotation. Because the two remainders approximate each other, the first remainder is the basis for determining how much the vehicle is angularly rotated.

Likewise, the sum of the outputs from all of the side wall sensors 11, 13, 14 and 16 would approximate the sum of the outputs from the central sensors 17 and 18, which is an output influenced little by the rotation. The substitution of these outputs for the difference between and the sum of the outputs from the central sensors 17 and 18 in the first through fifth embodiments can produce effects similar to those in those embodiments.

(Seventh Embodiment)

This embodiment excludes side wall sensors 11–16 and uses only central sensors 17 and 18.

Figure 10:
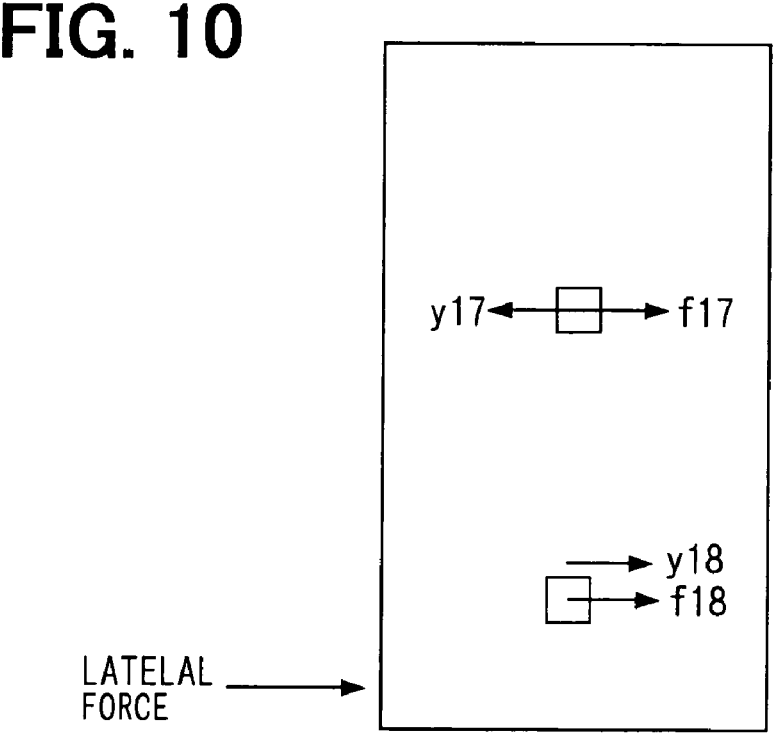
FIG. 10 is a schematic diagram of the seventh embodiment of the present invention.

This embodiment will be described with reference to FIG. 10 in a case where a lateral collision occurs at the rear portion of the left side wall of the vehicle. The outputs from the acceleration sensors 17 and 18 include lateral components f17 and f18, respectively. The outputs also includes components y17 and y18, respectively, resulting from the rotation.

As described above, the difference between the outputs from the central sensors 17 and 18 includes a large amount of lateral force resulting from the rotation component. Accordingly, by using this output difference (ΔV) as the basis for changing the threshold Vth for the central sensors 17 and 18, it is possible to reduce the influence of the rotation on the outputs from these sensors 17 and 18. The rotation little influences the sum of the outputs from the central sensors 17 and 18. Accordingly, by comparing this output sum with the threshold, it is likewise possible to determine whether the vehicle has a lateral collision, while inhibiting the influence of the rotation.

The influence of the rotation due to the lateral collision at the rear portion of the left side wall is exerted in such directions as to reduce the output V17 from the center front sensor 17 and increase the output V18 from the center rear sensor 18. Accordingly, by reducing the threshold Vth17 for the center front sensor 17 and increasing the threshold Vth18 for the center rear sensor 18, depending on the amplitude of the difference between the outputs from these sensors 17 and 18, it is possible to determine whether the vehicle has a lateral collision, independently by means of each sensor while inhibiting the influence of the rotation.

Figure 11:
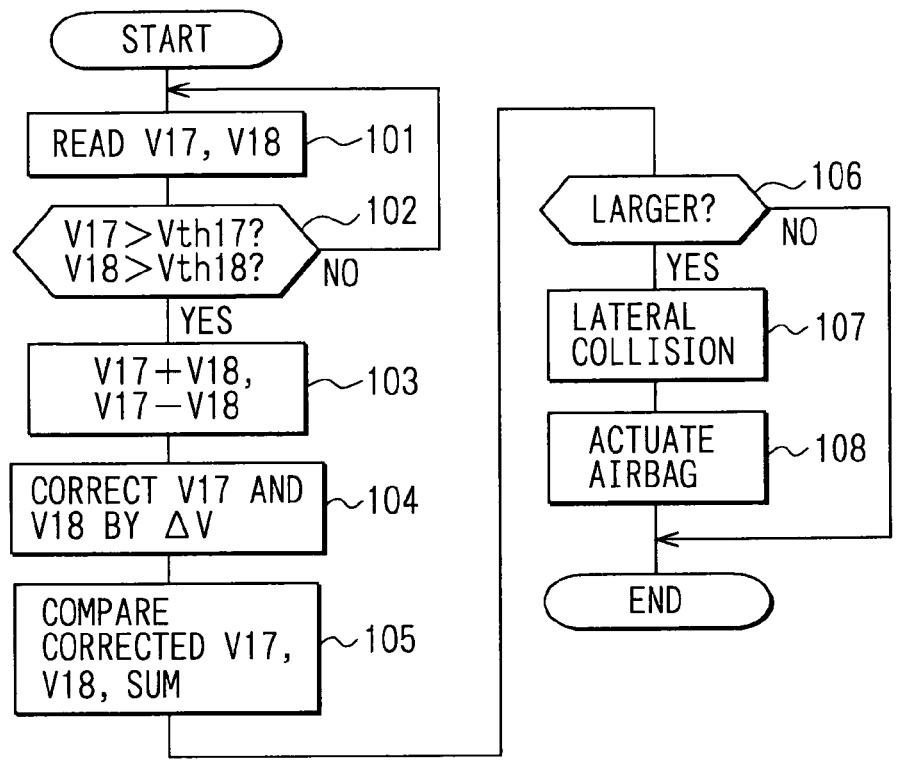
FIG. 11 is a flowchart of the determination process in the seventh embodiment.

Similar operations are represented by the flowchart shown in FIG. 11. In this operation, outputs V17 and V18 of the sensors 17 and 18 are corrected instead of changing thresholds Vth17 and Vth18. Specifically, the outputs V17 and V18 of the center sensors 17 and 18 are read at step 101. The outputs V17 and V18 are compared with the respective thresholds Vth17 and Vth18 at step 102. If the outputs are larger than the thresholds, the outputs V17 and V18 are added and subtracted at step 103. Then the outputs V17 and V18 are corrected by the difference (ΔV=V17−V18) at step 104. For instance, the outputs V17 and V18 are increased and decreased in proportion to the difference ΔV, respectively. The corrected outputs V17, V18 and the sum of the outputs are compared with respective thresholds at step 105. Then, at step 106, it is determined whether any one of the corrected V17, V18 and sum is larger than the respective threshold. If YES, a lateral collision is detected at step 107, and the airbag 60 is actuated at step 108. It is obvious that this flowchart can be replaced by hardware circuitry, as is the case with the other embodiments.

(Eighth Embodiment)

Figure 12:
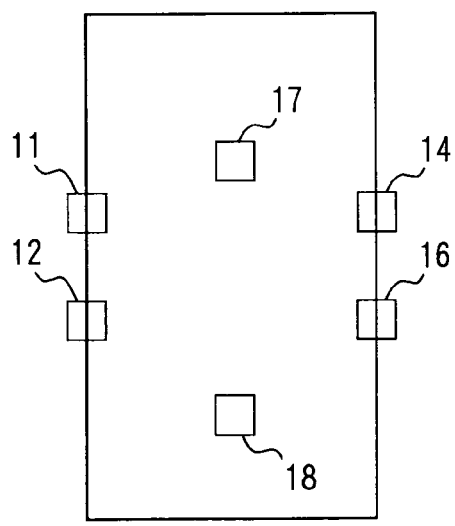
FIG. 12 is a schematic diagram of the eighth embodiment of the present invention.

This embodiment is shown in FIG. 12 and differs from the first embodiment in excluding the left rear sensor 13 and the right rear sensor 16. The control operation in this embodiment is similar to the arithmetic or operational determination processes in the first through fifth embodiments. However, the determination process for the side wall sensors 13 and 16 is omitted.

Instead, it is possible to carry out lateral collision determination by means of the center rear sensor 18 by computing the difference between the outputs from the central sensors 17 and 18 to find a signal influenced greatly by rotation, and correcting the output from or the threshold for the center rear sensor 18 depending on the amplitude of this signal. This makes it possible to reduce the number of acceleration sensors and the influence of rotation on lateral collision determination.

In each of the embodiments, it is assumed that the center of rotation, which is the longitudinal center of gravity, of the vehicle is positioned always between the central sensors 17 and 18. However, the positions of the engine etc. may shift the center front sensor 17 rearward of the center of rotation of the vehicle having a lateral collision. This reduces the component included in the difference between the outputs from the central sensors 17 and 18 and resulting from the rotation. Accordingly, it is preferable that the center front sensor 17 be positioned as forward as possible so that the center of rotation can be positioned between the central sensors 17 and 18, most preferably at the middle point between them.

In each of the embodiments, the thresholds for the comparison with the outputs for lateral collision determination are changed or corrected depending on how much the vehicle is angularly rotated. Alternatively, with the thresholds fixed, the outputs might be corrected.

In the additive and subtractive operations, the input signals might be weighted. The signals might be classified in different levels. Combinations of the signal levels and outputs might be stored in advance in the form of a map. Outputs could be obtained by substituting the levels of the input signals into the map.

In each of the embodiments, the acceleration sensors sense the rotation. Alternatively, the rotation might be sensed by exclusive rotation sensors. The outputs from the lateral force sensors could be corrected with the outputs from the rotation sensors.

What is claimed is:

1. A protection system against lateral collision for a vehicle including a driver seat and a passenger protecting device for protecting a passenger against a lateral collision, the protection system comprising:
    a sensing section for sensing a magnitude of an electric signal representing a physical quantity correlated to a lateral force exerted on the vehicle when the vehicle has a lateral collision, wherein the sensing section includes a first sensing section provided forward of a rear end of the driver seat and a second sensing section provided rearward of the rear end of the driver seat;
    a determining section for determining that the vehicle has the lateral collision if the sensed magnitude of the electric signal exceeds a predetermined threshold, wherein the determining section is constructed to perform a calculation by substituting outputs from the first and second sensing sections for the variables of a predetermined function that are outputs as non-binary signals from the first and second sensing sections, and wherein the determining section is further constructed to use a function value that is a result of the calculation as a basis for determining whether the vehicle has the lateral collision; and
    a controlling section for commanding actuation of the passenger protecting device if the determining section determines that the vehicle has a lateral collision,
    wherein the determining section determines whether the function value exceeds a predetermined threshold;
    wherein the determining section uses the result of the determination as a basis for determining whether the vehicle has a lateral collision,
    wherein the determining section determines whether a difference between outputs from the first and second sensing sections exceeds a predetermined threshold, and
    wherein the determining section uses a result of the determination as a basis for determining whether the vehicle has a lateral collision.

2. A protection system against lateral collision for a vehicle including a driver seat and a passenger protecting device for protecting a passenger against a lateral collision, the protection system comprising:
    a sensing section for sensing a magnitude of an electric signal representing a physical quantity correlated to a lateral force exerted on the vehicle when the vehicle has a lateral collision, wherein the sensing section includes a first sensing section provided forward of a rear end of the driver seat and a second sensing section provided rearward of the rear end of the driver seat;
    a determining section for determining that the vehicle has the lateral collision if the sensed magnitude of the electric signal exceeds a predetermined threshold, wherein the determining section is constructed to perform a calculation by substituting outputs from the first and second sensing sections for the variables of a predetermined function that are outputs as non-binary signals from the first and second sensing sections, and wherein the determining section is further constructed to use a function value that is a result of the calculation as a basis for determining whether the vehicle has the lateral collision; and
    a controlling section for commanding actuation of the passenger protecting device if the determining section determines that the vehicle has a lateral collision
    wherein the determining section determines whether the function value exceeds a predetermined threshold;
    wherein the determining section uses the result of the determination as a basis for determining whether the vehicle has a lateral collision,
    wherein the determining section determines whether a sum of outputs from the first and second sensing sections exceeds a threshold, and
    wherein the determining section uses a result of the determination as a basis for determining whether the vehicle has a lateral collision.

3. A protection system against lateral collision for a vehicle including a driver seat and a passenger protecting device for protecting a passenger against a lateral collision, the protection system comprising:
    a sensing section for sensing a magnitude of an electric signal representing a physical quantity correlated to a lateral force exerted on the vehicle when the vehicle has a lateral collision, wherein the sensing section includes a first sensing section provided forward of a rear end of the driver seat and a second sensing section provided rearward of the rear end of the driver seat;
    a determining section for determining that the vehicle has the lateral collision if the sensed magnitude of the electric signal exceeds a predetermined threshold, wherein the determining section is constructed to perform a calculation by substituting outputs from the first and second sensing sections for the variables of a predetermined function that are outputs as non-binary signals from the first and second sensing sections, and wherein the determining section is further constructed to use a function value that is a result of the calculation as a basis for determining whether the vehicle has the lateral collision; and
    a controlling section for commanding actuation of the passenger protecting device if the determining section determines that the vehicle has a lateral collision,
    wherein the determining section determines that the vehicle has a lateral collision if an output from either of the two sensing sections exceeds a predetermined threshold,
    wherein the determining section substantially changes the threshold on the basis of the function value, and
    wherein the determining section substantially changes the threshold on the basis of a difference between the outputs from the first and second sensing sections.

4. A protection system against lateral collision for a vehicle including a driver seat and a passenger protecting device for protecting a passenger against a lateral collision, the protection system comprising:

a sensing section for sensing a magnitude of an electric signal representing a physical quantity correlated to a lateral force exerted on the vehicle when the vehicle has a lateral collision, wherein the sensing section includes a first sensing section provided forward of a rear end of the driver seat and a second sensing section provided rearward of the rear end of the driver seat;

a determining section for determining that the vehicle has the lateral collision if the sensed magnitude of the electric signal exceeds a predetermined threshold, wherein the determining section is constructed to perform a calculation by substituting outputs from the first and second sensing sections for the variables of a predetermined function that are outputs as non-binary signals from the first and second sensing sections, and wherein the determining section is further constructed to use a function value that is a result of the calculation as a basis for determining whether the vehicle has the lateral collision; and a controlling section for commanding actuation of the passenger protecting device if the determining section determines that the vehicle has a lateral collision, wherein the determining section determines that the vehicle has a lateral collision if an output from either of the two sensing sections exceeds a predetermined threshold, wherein the determining section substantially changes the threshold on the basis of the function value, and wherein the determining section substantially changes the threshold on the basis of a sum of the outputs from the first and second sensing sections.

5. A protection system against lateral collision for a vehicle including a driver seat and a passenger protecting device for protecting a passenger against a lateral collision, the protection system comprising:

a sensing section for sensing a magnitude of an electric signal representing a physical quantity correlated to a lateral force exerted on the vehicle when the vehicle has a lateral collision, wherein the sensing section includes a first sensing section provided forward of a rear end of the driver seat and a second sensing section provided rearward of the rear end of the driver seat;

a determining section for determining that the vehicle has the lateral collision if the sensed magnitude of the electric signal exceeds a predetermined threshold, wherein the determining section is constructed to perform a calculation by substituting outputs from the first and second sensing sections for the variables of a predetermined function that are outputs as non-binary signals from the first and second sensing sections, and wherein the determining section is further constructed to use a function value that is a result of the calculation as a basis for determining whether the vehicle has the lateral collision; and a controlling section for commanding actuation of the passenger protecting device if the determining section determines that the vehicle has a lateral collision, wherein the first sensing section, which is forward of the rear end of the driver seat, includes a left front sensor and a right front sensor that are adjacent to the left and right side walls respectively of the vehicle and a center front sensor positioned centrally between both lateral sides of the vehicle, wherein the second sensing section, which is rearward of the rear end of the driver seat, includes a center rear sensor positioned centrally between both lateral sides of the vehicle, wherein the determining section substantially corrects the outputs from the left front and right front sensors on a basis of a result of a calculation of outputs from the center front and center rear sensors, and wherein the determining section determines that the vehicle has a lateral collision if either of the substantially corrected outputs exceeds a predetermined threshold.

6. A protection system against lateral collision for a vehicle including a passenger protecting device for protecting a passenger against a lateral collision, the protection system comprising:

a sensing section for sensing a magnitude of an electric signal representing a physical quantity correlated to a lateral force exerted on the vehicle when the vehicle has the lateral collision, wherein the sensing section includes a first sensing section and a second sensing section that are positioned centrally between both lateral sides of the vehicle, the first sensing section being forward and spaced a predetermined interval from the second sensing section;

a determining section for determining on a basis of the sensed magnitude of the electric signal that the vehicle has the lateral collision, wherein the sensed quantity includes at least outputs from the first and second sensing sections; and a controlling section for commanding an actuation of the passenger protecting device if the determining section determines that the vehicle has the lateral collision, wherein the determining section performs a calculation of a predetermined function of outputs from the first and second sensing sections, and uses the result of the calculation as the basis for determining whether the vehicle has a lateral collision, wherein the sensing section further includes a third sensing section adjacent to a lateral side wall of the vehicle, and wherein the determining section substantially corrects an output from the third sensing section with a calculation result and determines that the vehicle has a lateral collision if a substantially corrected output exceeds a predetermined threshold.

7. The protection system against lateral collision according to claim 6, wherein the determining section uses outputs from the first and second sensing sections as a basis for computing a signal correlated to a speed at which the vehicle is angularly rotated, uses the computed signal as the basis for substantially correcting an output from the third sensing section, and determines that the vehicle has a lateral collision if a magnitude of the substantially corrected output exceeds a predetermined threshold.

8. The protection system against lateral collision according to claim 6, wherein the determining section determines that the vehicle has a lateral collision if an output from either of the first and second sensing sections and an output from the third sensing section exceed the respective thresholds, performs a calculation by substituting an output from each of the first, second and third sensing sections in a predetermined function to find a function value, and determines that the vehicle has a lateral collision if the function value exceeds a predetermined threshold.

9. A protection system against lateral collision for a vehicle including a passenger protecting device for protecting a passenger against a lateral collision, the protection system comprising:
- a lateral force sensing section for sensing a lateral force exerted on the vehicle when the vehicle has the lateral collision;
- a rotation sensing section for sensing a rotation of the vehicle in which a vehicle front part and a vehicle rear part move in opposite lateral directions;
- a determining section for using outputs from the two sensing sections as a basis for determining whether the vehicle has the lateral collision; and
- a controlling section for commanding actuation of the passenger protecting device if the determining section determines that the vehicle has the lateral collision,
- wherein the determining section substantially corrects an output from the rotation sensing section on a basis of an output from the lateral force sensing section, and determines that the vehicle has a lateral collision if the substantially corrected output exceeds a predetermined threshold.

10. The protection system against lateral collision according to claim 9,
- wherein the rotation sensing section includes a plurality of the lateral force sensing sections spaced from each other longitudinally of the vehicle, and
- wherein the determining section detects a degree of rotation by means of a calculation of outputs from the lateral force sensing sections.

11. The protection system against lateral collision according to claim 10,
- wherein the rotation sensing section includes at least four sensing sections adjacent to both lateral side walls of the vehicle and spaced predetermined intervals longitudinally of the vehicle.

12. The protection system against lateral collision according to claim 10,
- wherein the rotation sensing section includes a first sensing section and a second sensing section that are positioned centrally between both lateral sides of the vehicle and spaced a predetermined interval longitudinally of the vehicle.

13. The protection system against lateral collision according to claim 12,
- wherein the lateral force sensing sections are adjacent to at least one of both lateral side walls of the vehicle and spaced predetermined intervals longitudinally of the vehicle.

14. The protection system against lateral collision according to claim 10,
- wherein the lateral force sensing sections forming the rotation sensing section are spaced from each other longitudinally of the vehicle with respect to a longitudinal center of gravity of the vehicle.

15. The protection system against lateral collision for a vehicle including a passenger protecting device for protecting a passenger against a lateral collision, the protection system comprising:
- a lateral force sensing section for sensing a lateral force exerted on the vehicle when the vehicle has the lateral collision;
- a rotation sensing section for sensing a rotation of the vehicle;
- a determining section for using outputs from the two sensing sections as a basis for determining whether the vehicle has the lateral collision; and
- a controlling section for commanding actuation of the passenger protecting device if the determining section determines that the vehicle has the lateral collision,
- wherein the determining section substantially corrects an output from the rotation sensing section on a basis of an output from the lateral force sensing section, and determines that the vehicle has a lateral collision if the substantially corrected output exceeds a predetermined threshold.

16. A protection system against lateral collision for a vehicle including a passenger protecting device for protecting a passenger against a lateral collision, the protection system comprising: a lateral force sensing section for sensing a lateral force exerted on the vehicle when the vehicle has the lateral collision;
- a rotation sensing section for sensing a rotation of the vehicle;
- a determining section for using outputs from the two sensing sections as a basis for determining whether the vehicle has the lateral collision; and
- a controlling section for commanding actuation of the passenger protecting device if the determining section determines that the vehicle has the lateral collision,
- wherein the rotation sensing section includes a plurality of the lateral force sensing sections spaced from each other longitudinally of the vehicle,
- wherein the determining section detects a degree of rotation by means of a calculation of outputs from the lateral force sensing sections, and
- wherein the rotation sensing section senses the rotation on a basis of a difference between outputs from the lateral force sensing sections spaced from each other longitudinally of the vehicle.

* * * * *